United States Patent
Thai et al.

(10) Patent No.: US 10,812,713 B2
(45) Date of Patent: Oct. 20, 2020

(54) SELECTING CAMERA MODES FOR ELECTRONIC DEVICES HAVING MULTIPLE DISPLAY PANELS

(71) Applicant: HEWLETT-PACKARD DEVELOPMENT COMPANY, L.P., Houston, TX (US)

(72) Inventors: Thong Thai, Houston, TX (US); Rahul V. Lakdawala, Houston, TX (US); Mike Provencher, Houston, TX (US); Syed S. Azam, Houston, TX (US); Jeffrey Kevin Jeansonne, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/080,948

(22) PCT Filed: Oct. 25, 2016

(86) PCT No.: PCT/US2016/058617
§ 371 (c)(1),
(2) Date: Aug. 29, 2018

(87) PCT Pub. No.: WO2018/080442
PCT Pub. Date: May 3, 2018

(65) Prior Publication Data
US 2019/0075240 A1    Mar. 7, 2019

(51) Int. Cl.
*H04N 5/225*    (2006.01)
*G06F 1/16*    (2006.01)
(Continued)

(52) U.S. Cl.
CPC ....... *H04N 5/23245* (2013.01); *G06F 1/1605* (2013.01); *G06F 1/1616* (2013.01);
(Continued)

(58) Field of Classification Search
CPC .......... G06F 3/03; G06F 3/038; G06F 3/0354; G06F 3/041; G06F 1/1618; G06F 1/1647;
(Continued)

(56) References Cited

U.S. PATENT DOCUMENTS 7,046,287 B2 * 5/2006 Nishino .............. H04M 1/0216
348/333.06
8,314,859 B2 * 11/2012 Kim ..................... H04N 5/2251
348/222.1

(Continued)

FOREIGN PATENT DOCUMENTS

CN    105120180 A    12/2015
EP    2674834 A2    12/2013
(Continued)

OTHER PUBLICATIONS

Alan, "Turn Your Rear-Facing Camera Into a Front-Facing One With Vainworks", Retrieved from Internet: http://www.phonearena.com/news/Turn-your-rear-facing-camera-into-a-front-facing-one-with-Vainworks_id15672, Jan. 3, 2011, 3 pages.

*Primary Examiner* — Ngoc Yen T Vu
(74) *Attorney, Agent, or Firm* — Trop, Pruner & Hu P.C.

(57) ABSTRACT

A technique includes, on an electronic device that includes a plurality of display panels that are mounted to allow physically positioning of the display panels to create a plurality of potential display configurations for the electronic device, sensing the display configuration associated with current positions of the display panels. A camera is mounted on a given display panel of the plurality of display panels, and the technique includes selecting a camera mode for the electronic device based at least in part on the sensed display configuration.

20 Claims, 6 Drawing Sheets

(51) Int. Cl.
*G06F 3/147* (2006.01)
*H04N 5/232* (2006.01)
*H04N 5/247* (2006.01)
*G06F 3/14* (2006.01)

(52) U.S. Cl.
CPC .......... *G06F 1/1618* (2013.01); *G06F 1/1647* (2013.01); *G06F 1/1677* (2013.01); *G06F 1/1686* (2013.01); *G06F 3/1423* (2013.01); *H04N 5/225251* (2018.08); *H04N 5/232* (2013.01); *H04N 5/247* (2013.01); *G06F 3/147* (2013.01); *G09G 2354/00* (2013.01)

(58) Field of Classification Search
CPC .............. G06F 1/1616; H04N 5/23245; H04N 5/225251
See application file for complete search history.

(56) References Cited

U.S. PATENT DOCUMENTS

| | | | |
|---|---|---|---|
| 8,654,238 B2* | 2/2014 | Fujinawa | H04N 1/00442 |
| | | | 348/333.01 |
| 9,742,989 B2* | 8/2017 | Ishizuka | G03B 9/64 |
| 2008/0231740 A1 | 9/2008 | Mcintyre et al. | |
| 2012/0081270 A1* | 4/2012 | Gimpl | G06T 3/0006 |
| | | | 345/1.3 |
| 2012/0218202 A1* | 8/2012 | Sirpal | G06F 1/1616 |
| | | | 345/173 |
| 2014/0240499 A1 | 8/2014 | Hsu | |
| 2014/0362257 A1 | 12/2014 | Viljamaa et al. | |
| 2016/0282964 A9* | 9/2016 | Kim | G06F 3/03545 |

FOREIGN PATENT DOCUMENTS

| | | | | |
|---|---|---|---|---|
| EP | 2741173 A2 | 6/2014 | | |
| EP | 2741173 A2 * | 11/2014 | ............ | G06F 3/038 |
| KR | 20150009133 A | 1/2015 | | |
| WO | 2010028394 A1 | 3/2010 | | |

* cited by examiner

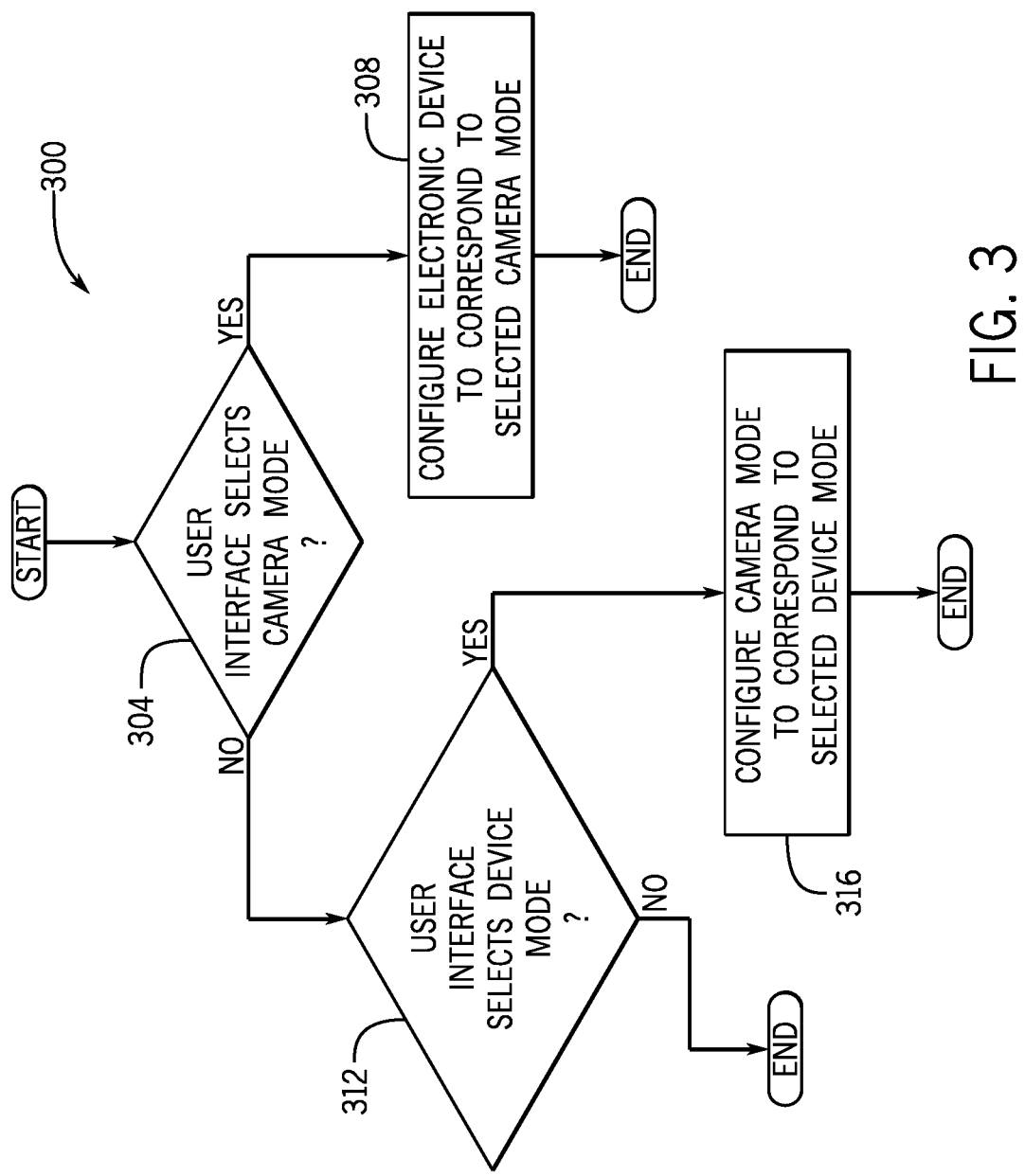

SELECTING CAMERA MODES FOR ELECTRONIC DEVICES HAVING MULTIPLE DISPLAY PANELS

BACKGROUND

An electronic device, such as a smartphone, may have multiple cameras for purposes of allowing a user of the device to capture still or video images that are directed toward or away from the user. For example, a smartphone may have a front facing camera that is disposed on the front face of the smartphone for purposes of capturing images are directed toward the user, and the smartphone may have a rear facing camera that is disposed on the rear face of the smartphone for purposes of capturing images that are directed away from the user.

BRIEF DESCRIPTION OF THE DRAWINGS

FIG. 3 is a flow diagram depicting a technique to control the electronic device in response to a user interface of an electronic device selecting a camera mode or a device mode for the electronic device according to an example implementation.

DETAILED DESCRIPTION

Figure 1:
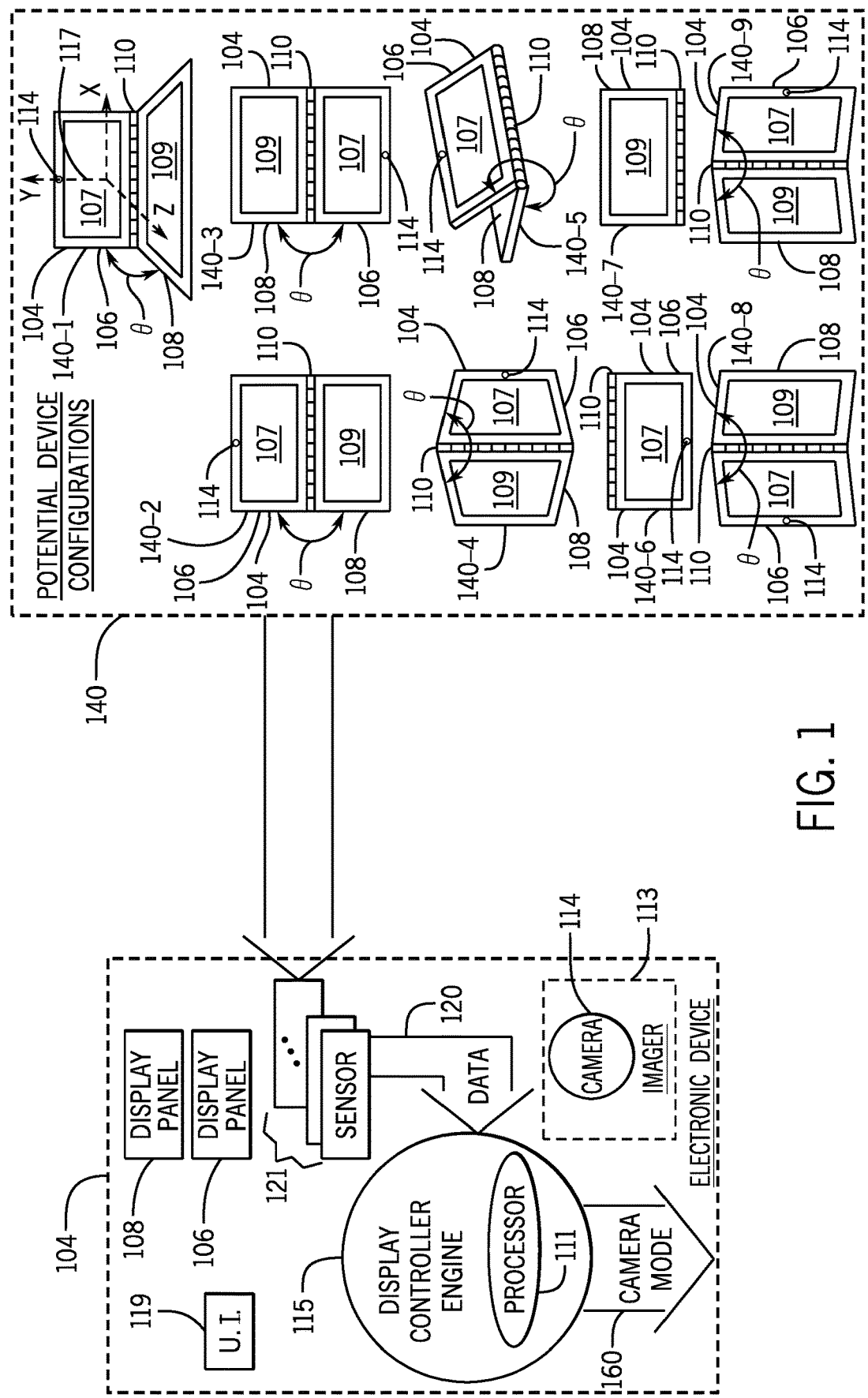
FIG. 1 is a schematic diagram of an electronic device illustrating the selection of a camera mode by the electronic device based on a sensed display configuration of the electronic device according to an example implementation.

In accordance with example implementations that are described herein, an electronic device (a tablet, a notebook computer, a smartphone, and so forth) has multiple display panels. For example, in accordance with example implementations, an electronic device may have two display panels that are connected together via a pivoting connection, such as a hinge connection. In this context, a "display panel" refers to a unit, which contains, among other potential components, a housing and an electronic visual display device (a light emitting diode (LED)-based touch screen, for example) which has a display surface (called a "display" herein). In accordance with example implementations, the display panel may contain a graphical processor to render and display content on the display device of the display panel, along with other components (one or multiple central processing unit (CPU) components, memory components, wireless communication components, touch screen interface components, and so forth).

Moreover, in accordance with example implementations, the housing of the display panel may include a hinge connector, which is configured to mate with a corresponding hinge connector of another display panel. The display panels may be attached to each other and detached from one another at the hinge connector. In this manner, in accordance with example implementations, two display panels may be connected together so that the display panels, when attached, may be used as an integral unit (one display panel being used as a virtual keyboard to input data for an application whose graphical output is displayed on the other display panel, for example), or the display panels, when detached, may be used as separate devices for such purposes as gaming, collaboration being multiple users, and so forth.

In accordance with example implementations, the electronic device contains a camera that is mounted to one of the display panels. More specifically, in accordance with example implementations, the camera may be a front, or user, facing camera, which is directed toward a user of the electronic device. In this manner, the camera may be mounted to the display panel so that the camera captures images of a user of the electronic device, assuming that the user is viewing the display of the display panel to which the camera is mounted. In the following discussion, unless otherwise noted, the "user" of the electronic device is the primary person using the electronic device, i.e., viewing content displayed by the electronic device, providing input to the electronic device, and so forth. It is noted that, as further described herein, the user may share the electronic device with others. This sharing may include the user and at least one other person viewing content that is displayed by the electronic device, such as, for example, content that is displayed on both of the electronic device's displays.

For camera use, the electronic device may have two modes of operation: a user facing mode of operation (also called a "user facing camera mode" herein) in which the camera captures images that are displayed on the display of the display panel to which the camera is mounted; and a world facing mode of operation (also called a "world facing mode" herein) in which the camera captures images, which are displayed on the display of the other display panel. In this manner, for the user facing mode, the camera nominally is directed toward the user, or viewer, of the display panel to which the camera is mounted; and for the world facing mode, the electronic device is configured so that the camera is nominally directed away from the user so that the user may view "world facing" images that are acquired by the camera. In this context, the camera "capturing" an image refers to an imaging sensing element (an imaging array, for example) of the camera acquiring data, which represents the image.

The display panels of the electronic device may be placed in a variety of different physical positions to form physical configurations that are associated with different "device modes" of the electronic device. As examples, the device modes may include a user facing tablet mode (in which the display panels are fully opened about the hinge connection such that the electronic device resembles a tablet and the camera faces the user), a clam shell mode (in which the display panels are opened by about ninety degrees about the hinge connection such that the electronic device resembles the working position for a laptop computer), and so forth.

In general, the physical configuration of the display panels, called the "physical display configuration" herein, may be defined by the overall spatial orientation of the electronic device and the positions of the display panels relative to each other. In this manner, the electronic device may be positioned to cause the displays to be in portrait orientations (orientations in which the elongated dimensions of the display panels are closer to being aligned with the vertical, or gravity-associated, direction than with the horizontal direction) or landscape orientations (orientations in which the elongated dimensions of the display screens are closer to being aligned with the horizontal direction than with the vertical direction). The electronic device may be positioned to cause the display panels to face up or down or cause one display panel to be closer to the user than the other display panel. Moreover, the display panels may be pivoted with respect to the hinge connection toward each other or away from each other to create different opening angles between the display panels.

A camera mode that is appropriate for one device mode may be inappropriate for another device mode. For example, the electronic device may be physically configured to correspond to a user facing tablet device mode in which the display panels are fully opened to form a tablet and the camera faces the user. For this device mode, the user facing camera mode may be appropriate because the display that faces the user serves as the viewfinder for the camera. However, the user may flip the computer (rotate about a horizontal axis, for example), so that the camera now faces away from the user. For this mode, the world facing camera mode may be the appropriate mode.

In accordance with example implementations that are described herein, an electronic device contains a display controller engine, which senses the physical display configuration of the electronic device and controls, or regulates, a camera mode of operation for the electronic device based on the sensed physical display configuration. Therefore, in accordance with example implementations, the electronic device may automatically control its camera mode to track changes in the physical display configuration.

Moreover, in accordance with example implementations, the display controller engine may control the selection of the camera mode based on one or multiple factors other than the sensed physical display configuration. As examples, user input may be used to override the automatic camera mode selection; and the display controller engine may select the camera mode based on a user-selected device mode. Moreover, in accordance with example implementations, the display controller engine may base the selection of the camera mode on sensory data, which indicates the intent of the user to use the electronic device's camera.

As a more specific example, FIG. 1 depicts an electronic device 104 in accordance with some implementations. In accordance with example implementations, the electronic device 104 may be a portable, or handheld, electronic device, such as a portable computer, a smartphone, a wearable device, and so forth. The electronic device 104 includes multiple display panels, such as display panels 106 and 108; and the display panels 106 and 108 may be connected together, such as through the use of a hinge connection 110. The electronic device 104 contains one or multiple imagers 113, such as a camera 114, which, for example implementations that are described herein, is mounted to the display panel 106 and has an orientation to capture images of a user when the user faces a display surface, or display 107, of the display panel 106. It is noted that although the electronic device 100 may have multiple imagers or cameras, for purposes of clarity, the camera 114 and the regulation or selection of the camera mode of the camera 114 are described herein.

FIG. 1 depicts potential display configurations 140 for the electronic device 104, depending on the overall spatial orientation of the electronic device 104 (such as the spatial orientation of the electronic device 104 relative to the vertical direction, or direction of gravity) and an opening angle θ between the display panels 106 and 108. As depicted in FIG. 1, for reference, local orthogonal X, Y and Z axes 117 may be defined with respect to the display panel 106, where the X axis 117 corresponds to the pivot axis of the hinge connection 110; and the Z axis 117 may be generally aligned with a surface normal of the display surface 107 of the display panel 106 and have a positive directed toward the user when the user is in front of the display panel 106. In accordance with example implementations, the camera 114 has an optical axis that is aligned with the Z axis 117. The opening angle θ is the angle between the display panels 106 and 108 about the hinge connection 110, i.e., about the X axis 117.

The display panels 106 and 108, in accordance with example implementations, are rectangular and accordingly, have portrait orientations and landscape orientations, depending on their spatial orientations. The "landscape orientation" for the display panel 106, 108 refers to the display panel 106, 108 being positioned such that the elongated dimension of the display panel 106, 108 is more horizontal than vertical (i.e., the local X axis 117 is more horizontal than vertical); and the "portrait orientation" for the display panel 106, 108 refers to the display panel 106, 108 being positioned such that the elongated dimension of the display panel 106, 108 is more vertical than horizontal (i.e., the local X axis 117 is more vertical than horizontal).

The electronic device 104 may include a display controller engine 115 to, based on data 120 that sensed by one or multiple sensors 121, detect the particular display configuration 140 and based at least in part on the detected display configuration 140, select a camera mode of operation, or "camera mode," for the device 104, as indicated at reference numeral 160. In accordance with some implementations, the camera modes include a user facing camera mode, in which the display 107 of the display panel 106 serves as a viewfinder to display images that are acquired by the camera 114. Thus, for example, the user facing camera mode is used when the positive direction of the local Z axis 117 is in the general direction toward the viewer of the display 107. The camera modes also include a world facing camera mode in which a display surface, or display 109, of the display panel 108 serves as the viewfinder to display images that are acquired by the camera 114. Thus, for example, the world facing camera mode is used when the positive direction of the local Z axis 117 is in the general direction away from the viewer of the display 107.

As depicted in FIG. 1, in accordance with some implementations, the display controller engine 115 may be a microprocessor-based engine, and as such, the display controller engine 115 may include one or multiple processors 111 (one or multiple central processing units (CPUs), one or multiple CPU processing cores, and so forth). The sensor data 120 received by the display controller engine 115 represents a sensed physical display configuration for the electronic device 104, in accordance with example implementations.

In accordance with some implementations, the hinge connection 110 may be a releasable connection in that the display panels 106 and 108 may be detached from one another and wirelessly communicate with each other when detached. In accordance with example implementations, the device modes that are described herein pertain to display configurations in which the display panels 106 and 108 are attached via the hinge connection 110. However, in accordance with further example implementations, the display controller engine 115 may sense relative orientations of the display panels 106 and 108 when the display panels 106 and 108 are detached from each other and control a camera mode for the electronic device 104 in response thereto.

In accordance with example implementations, the display controller engine 115 may, based at least in part on the sensor data 120, classify the sensed display configuration as belong to one of nine potential display configurations 140. Each display configuration 140, in turn, is associated with, or corresponds to, a device mode for the electronic device 100. Therefore, by sensing the display configuration, the display controller engine 115 may identify the device mode and select the camera mode that corresponds to this device mode.

FIG. 1 depicts a clam shell display configuration 140-1 that corresponds to a clam shell device mode for the electronic device 100. In accordance with example implementations, for the clam shell display configuration 140-1, an opening angle θ between the display panels 106 and 108 about the local X axis 117 is between 45 and 135 degrees (as an example), and the display panels 106 and 108 are in landscape orientations. In response to detecting the clam shell display configuration 140-1, the display controller engine 115 may select the user facing camera mode, in accordance with example implementations, as it may be assumed that the camera 114 is directed toward the viewer of the display 107, i.e., the camera 114 faces the user. Moreover, in accordance with example implementations, for the clam shell device mode, the display controller engine 115 may, select the landscape orientation for content that appears on the displays 107 and 109.

As also depicted in FIG. 1, the potential display configurations 140 may include flat display configurations 140-2 and 140-3, in which the opening angle is between 135 and 225 degrees (as an example). In accordance with example implementations, the flat display configuration 140-2 corresponds to a device mode in which the display panel 108 is closer to a user of the electronic device 104, whereas the flat display configuration 140-3 corresponds to a device mode in which the display panel 106 is closer to the user. In accordance with example implementations, the display controller engine 115 may determine which display panel 106 or 108 is closer to the user based on an output of touch sensors of the electronic device 104, detected interaction of the user with a particular display panel (the use of a particular display panel as being used as a keyboard, for example), and so forth.

In response to detecting either the flat display configuration 140-2 or 140-3, in accordance with some implementations, the display controller engine 115 selects the user facing camera mode. Moreover, in accordance with example implementations, for the flat display configuration 140-2, the display controller engine 115 may select the reverse landscape orientation for content displayed on the display 107 and select the landscape orientation for content that is displayed on the display 109 of the display panel 108. For the flat display configuration 140-3, the display controller engine 115 may select the reverse landscape orientation for content displayed on the display 109 and select the landscape orientation for content that is displayed on the display 107 of the display panel 108.

It is noted that for the above-examples, it is assumed that the user is viewing the displays 107 and 109 in landscape orientations, as depicted in FIG. 1. However, the electronic device 104 may be rotated ninety degrees from the flat display configurations 140-2 and 140-3 that are depicted in FIG. 1, such that the user views the displays 107 and 109 in flat device modes in portrait orientations. The display controller engine 115 may detect orientations of the displays 107 and 109 using positional sensor data or through the use of other sensors, such as touch sensors, for example, to detect that the user is viewing the display 107 in the portrait orientation and in a flat device mode. When the display controller engine 115 detects a flat device mode and detects that the user is viewing the displays 107 and 109 in portrait orientations, the display controller engine 115 may select the user facing mode and select portrait/reverse portrait orientations for content displayed on the displays 107 and 109.

The electronic device 104 may be placed in a display configuration 140-4 or 140-5 in which the opening angle θ may be between 225 to 315 degrees (as an example). The electronic device, when placed in the display configuration 140-4, resembles a tent and corresponds to a tent device mode for the electronic device; and the electronic device, when placed in the other display configuration 140-5, resembles a stand (with the display panel 108 forming the base of the stand) and corresponds to a stand device mode for the electronic device 100. In accordance with example implementations, the display controller engine 115 may distinguish the tent display configuration 140-4 from the stand display configuration 140-5 by determining, for example, whether both display panels 106 and 108 are vertically inclined (for the tent display configuration 140-4) or not (for the stand display configuration 140-5). In accordance with example implementations, in response to detecting the tent display configuration 140-4, the display controller engine 115 may select the world facing camera mode and select the landscape orientation for the content displayed on both displays 107 and 109. Moreover, in response to detecting the stand display configuration 140-5, the display controller engine 115 may select the user facing camera mode; turn off the display panel 108; and select a landscape orientation for content that is displayed on the display 107.

The electronic device 104 may also be placed in a tablet display configuration, such as a user facing tablet display configuration 140-6 (which corresponds to a user facing tablet device mode) or a world facing tablet display configuration 140-7 (which corresponds to a world facing tablet device mode). In the tablet device display configuration 140-6 or 140-7, the electronic device 104 is fully or near fully opened, with the opening angle θ being between 315 to 360 degrees (as an example). Moreover, one of the display panels 106 and 108 faces the user, with the other display panel 106 or 108 facing away from the user. More specifically, the display controller engine 115 may identify the user facing tablet display configuration 140-6 by detecting that the display 107 faces the user (through display panel position data, user detected interaction with the display panel 106, and so forth). For the user facing tablet display configuration 140-6, the display controller engine 115 may select the user facing camera mode and select the appropriate landscape or portrait orientation for content displayed on the display 107.

The display controller engine 115 may identify the world facing tablet display configuration 140-7 by detecting that the display 109 faces the user. For the world facing tablet display configuration 140-7, the display controller engine 115 may select the world facing camera mode and select the appropriate landscape or portrait orientation for the content that is displayed on the display 109.

The potential display configurations 140 may also include book display configurations 140-8 and 140-9 in which the opening angle θ is 45 to 180 degrees (as an example), and the displays panels 106 and 108 are in portrait orientations. For both book display configurations 140-8 and 140-9, the display engine controller 115 may select the user facing camera mode. Moreover, in accordance with example implementations, the display controller engine 115 may select the portrait orientation for content displayed on the displays 107 and 109 for the book display configuration 140-8, and the display controller engine 115 may select the reverse portrait orientation for content displayed on the displays 107 and 109 for the book display configuration 140-9.

Figure 2A:
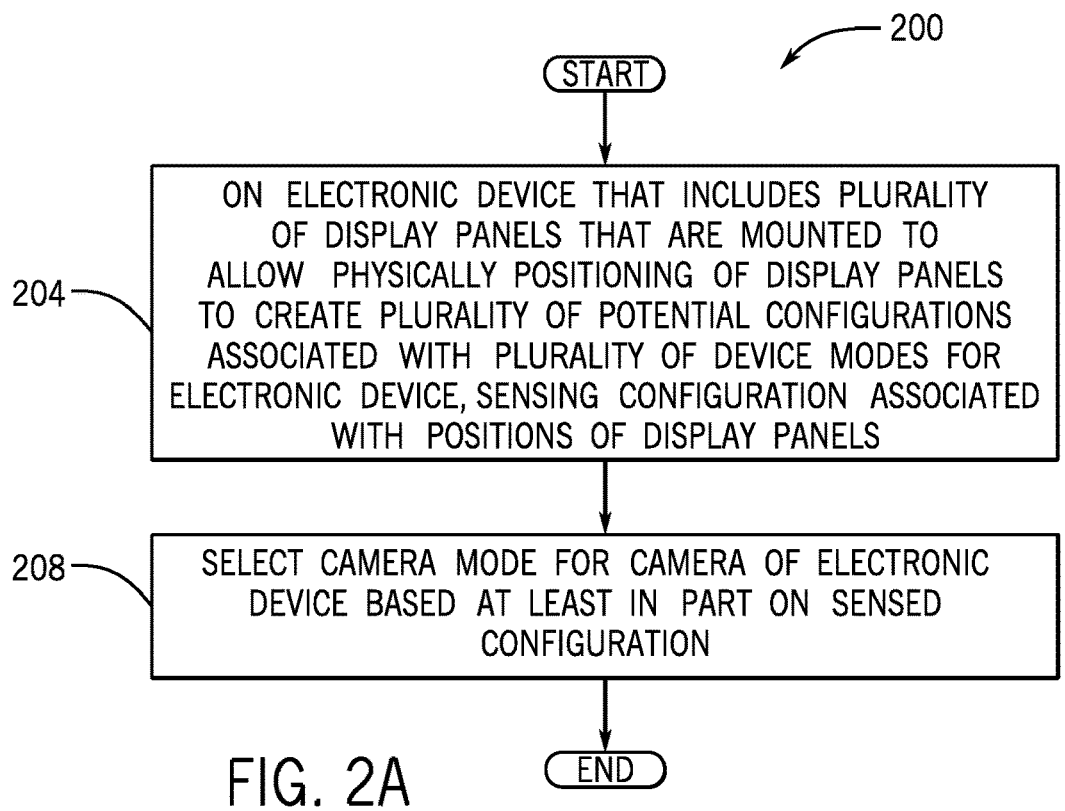
FIGS. 2A, 2B, 4A and 4B are flow diagrams depicting techniques used by an electronic device to automatically select a camera mode according to example implementations.

Thus, referring to FIG. 2A, in accordance with example implementations, a technique 200 includes, on an electronic device that includes a plurality of display panels that are mounted to allow physical positioning of the display panels to create a plurality of potential associated configurations that are associated with a plurality of device modes for the electronic device, sensing (block 204) the configuration that is associated with the current positions of the display panels. A camera mode for a camera of the electronic device may then be selected, pursuant to block 208, based at least in part on the sensed configuration.

Figure 2B:
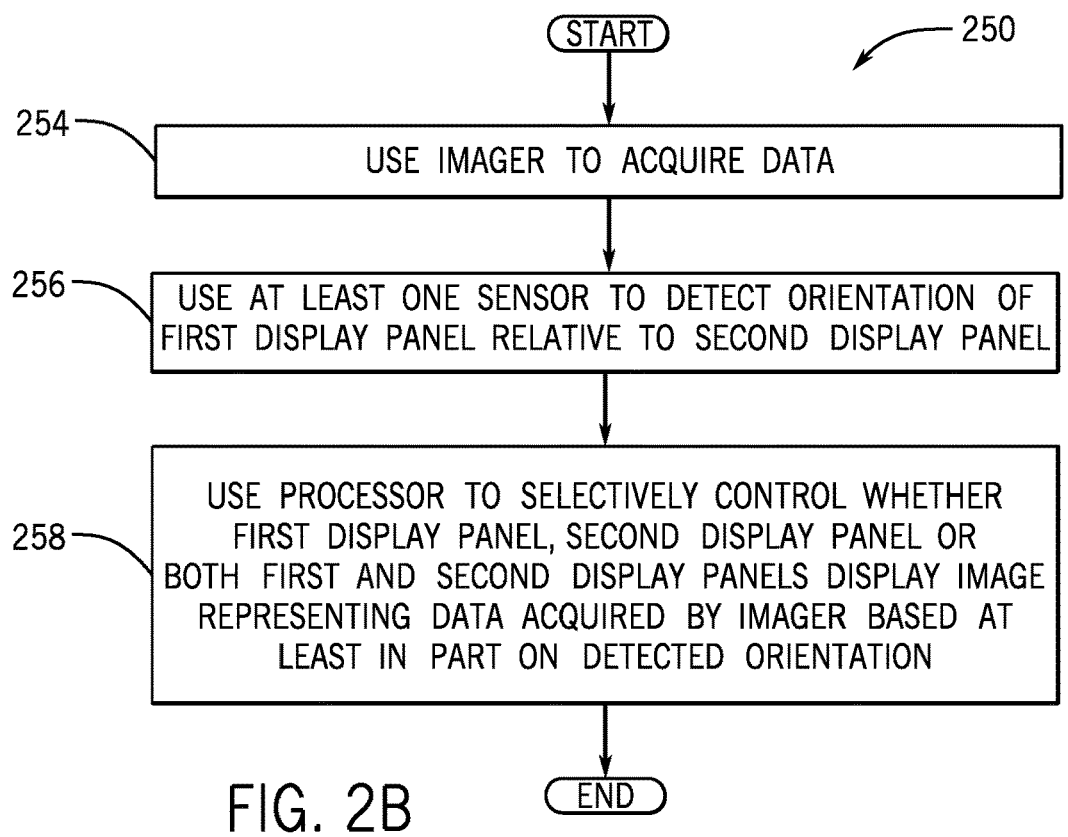

More specifically, in accordance with example implementations, a technique 250, which is depicted in FIG. 2B, includes using an imager (a camera, for example) to acquire data pursuant to block 254 and at least one sensor to detect an orientation of a first display panel relative to a second display panel, pursuant to block 256. The technique 250 includes a processor selectively controlling whether the first display panel, the second display panel or both the first and second display panels display an image representing the data acquired by the imager based at least in part on the detected orientation, pursuant to block 258.

Referring back to FIG. 1, in accordance with example implementations, the electronic device 104 includes a user interface 119, which allows the user to select an option to allow the display controller engine 115 to automatically regulate the camera mode, as described herein. The user interface 119 may allow the user to select an option that allows the user to override the automatic camera mode selection and select a camera mode that is identified by the user.

As an example, the user interface 119 may be a graphical user interface (GUI), and the GUI may display options which, for example, allow the user to select automatic camera mode regulation, override automatic camera mode selection and manually selected the camera mode, select the device mode of the electronic device 100, select landscape or portrait orientations for content displayed on the displays 107 and 109, and so forth. The display controller engine 115 may, based on the user selected options, perform a technique 300 that is depicted in FIG. 3.

More specifically, referring to FIG. 3 in conjunction with FIG. 1, in accordance with some implementations, the electronic device 104 may allow the user, through the user interface, to select the camera mode or select the device mode of the electronic device. The technique 300 includes determining (decision block 304) whether the user interface selects the camera mode for the electronic device. If so, the technique 300 includes configuring (block 308) the electronic device to correspond to the selected camera mode. For example, in accordance with example implementations, if the user selects the user facing camera mode, then, the display controller engine 115 may display images acquired by the camera 114 on the display 107 in a landscape or portrait orientation (depending on the orientation of the display panel 106) and disable the display 109. The user interface may, in accordance with example implementations, allow sharing of the viewfinder image of the camera 114. For example, for purposes of the user collaborating with another person, the user may select a sharing mode of operation so that both displays 107 and 109 display the images that are acquired by the camera 114.

Pursuant to technique 300, a determination may be made (decision block 312) whether the user interface selects the device mode. In this manner, instead of allowing the electronic device 100 to sense the physical display configuration and automatically determine the corresponding device mode, the user may override this feature and manually select the device mode. Pursuant to the technique 300, the display controller engine 115 configures (block 316) the camera mode to correspond to the device mode selections.

In accordance with example implementations, when automatically selecting the camera mode for the electronic device 104, the display controller engine 115 may select the camera mode based on one or multiple factors in addition to the sensed physical display configuration. In this manner, although the physical display configuration may correspond to a particular device mode, the user may not intend to use the camera, change the camera mode or change the device mode. For example, a user may have folded the display panels 106 and 108 in a manner that corresponds to a tablet device mode. However, the user may be merely carrying the electronic device 104. In accordance with example implementations, the display controller 115 evaluates sensor data to determine an indicator of the intent of the user and uses this indicator in the regulation of the camera mode.

Figure 4A:
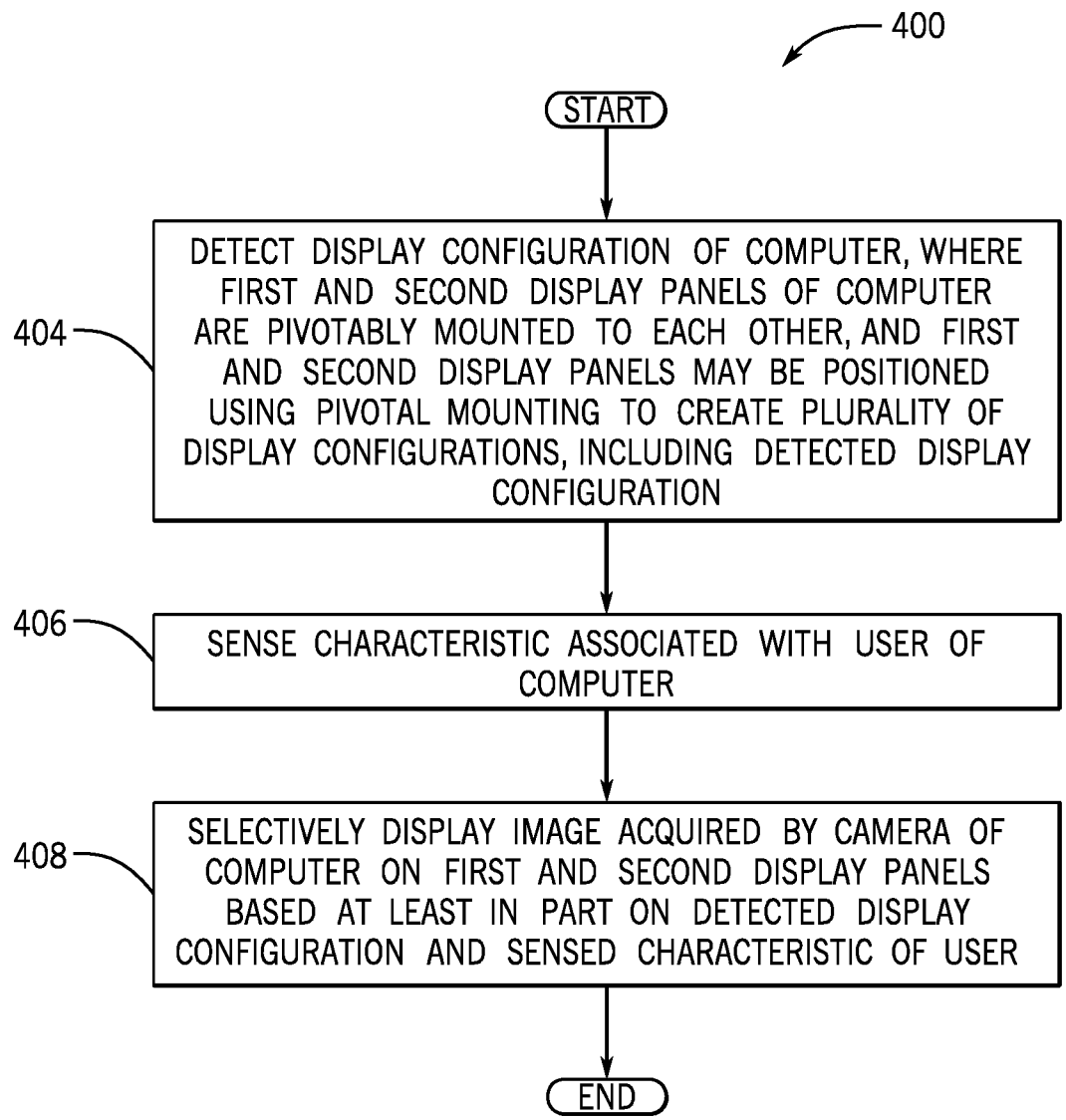

As a more specific example, the display controller 115 may generally use a technique 400 that is depicted in FIG. 4A, in accordance with example implementations. Referring to FIG. 4A in conjunction with FIG. 1, the technique 400 includes detecting (block 404) a display configuration of a computer. First and second display panels of the computer are pivotably mounted to each other, and the first and second display panels may be positioned using the pivotal mounting to create a plurality of display configurations, including the detected display configuration. The technique 400 includes sensing (block 406) a characteristic that is associated with a user of the computer and selectively displaying (block 408) an image that is acquired by a camera of the computer on the first and second displays based at least in part on the detected display configuration and the sensed characteristic of the user.

Figure 4B:
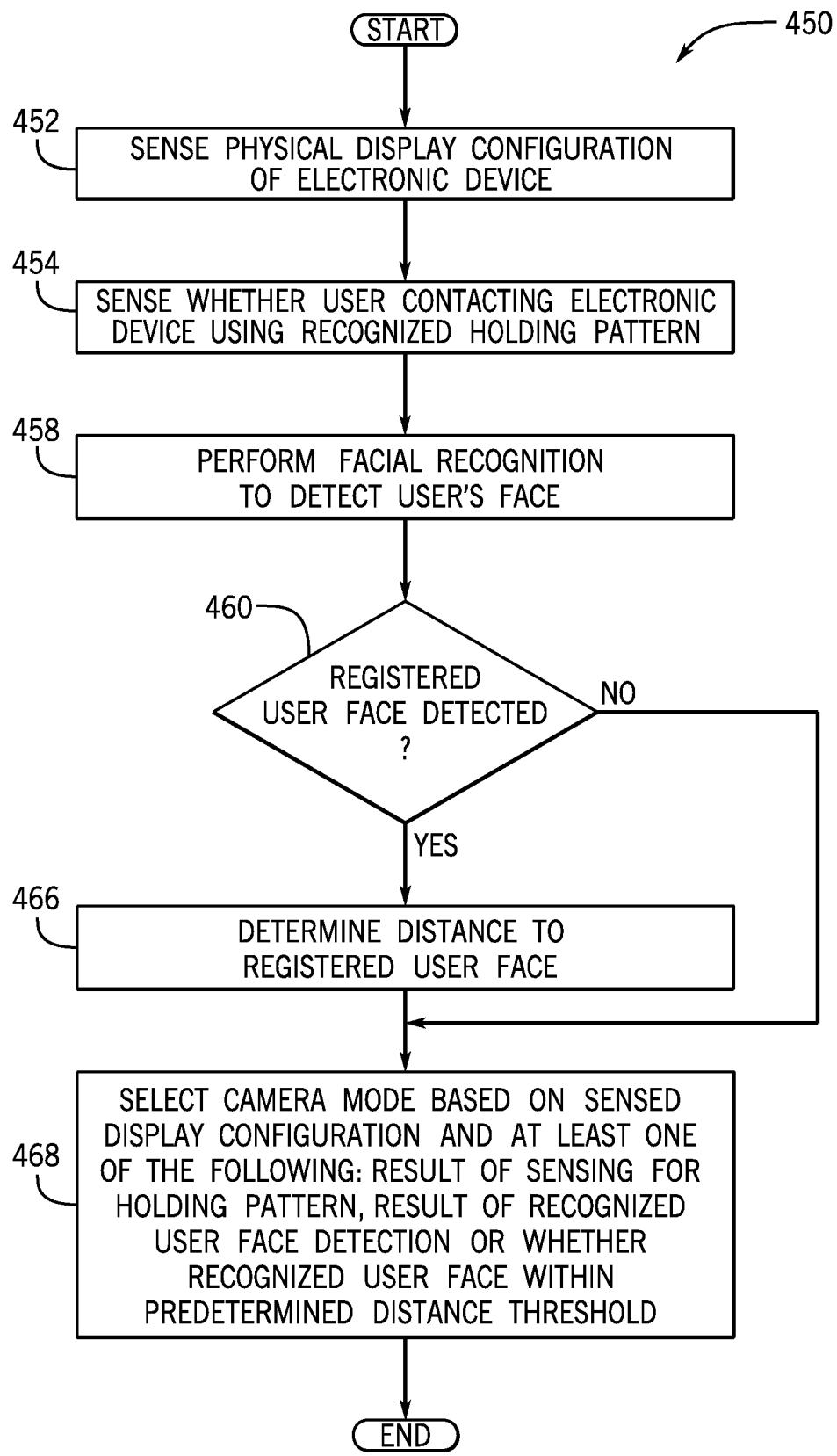

More specifically, referring to FIG. 4B in conjunction with FIG. 1, in accordance with example implementations, the display controller engine 115 may perform a technique 450 that includes sensing (block 452) a display configuration for an electronic device and sensing (block 454) whether a user is contacting the electronic device using a recognized holding pattern. In this manner, the display controller engine 115, may, for example, through touch screen input or through capacitive sensors (for example) detect finger positions on the electronic device 104; and from these detected finger positions, the display controller engine 115 may determine the manner in which the user is holding the electronic device 104 (determine whether the user is holding the electronic device 104 using a grip position that is associated with carrying the electronic device 104, for example). Therefore, based on this determination, the display controller engine 115 may determine whether the user merely carrying the device, intends to use the electronic device 104, and so forth.

The display controller engine 115 may also perform (block 458) facial recognition for purposes of detecting a recognized user face. In this regard, if the user intends to view a camera image, then the user may, in accordance with example implementations, be looking into the display 107, which allows acquisition of an image (by the camera 114) of the user's face and the processing of the image using a facial recognition analysis program to compare a face (if detected) to recognized faces, which may or may not be authorized. Moreover, in connection with performing facial recognition, the display controller engine 115 may determine (decision block 460) whether a detected user is a registered (authorized, for example) user. If so, the display controller engine 115 may then determine (block 466) a distance to the user face. In this manner, the distance may be used by the display controller engine 115 as an indicator of the intent of the user to use electronic device 104 (i.e., the closer the user the higher the inferred intent). Using this information, the display controller engine 115 may select the camera mode, pursuant to block 468. In this manner, in the selection process, the display controller engine 115 may select the camera mode based on the detected display configuration and at least one of the following: the result of the sensing for the holding pattern, the result of the recognized user face detection and/or whether a recognized user face is within a predetermined distance threshold.

Figure 5:
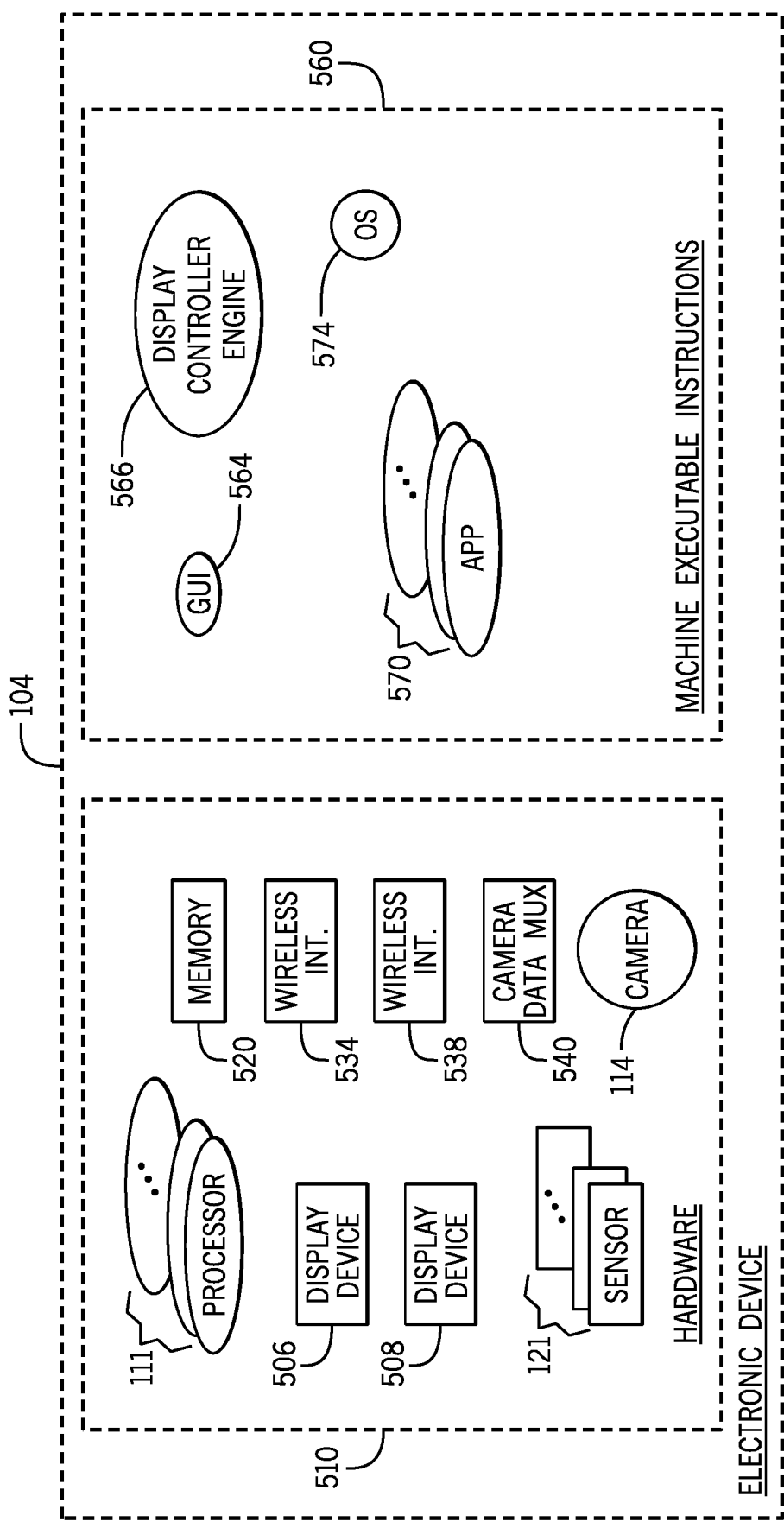
FIG. 5 is a schematic diagram of the electronic device according to an example implementation.

Referring to FIG. 5, in accordance with example implementations, the electronic device 104 may be a physical machine that includes hardware 510 and machine executable instructions 560, or "software." More specifically, in accordance with example implementations, the hardware 510 may include one or multiple processors 111 (one or multiple central processing units (CPUs) or CPU processing cores, for example) and a memory 520. In accordance with example implementations, one or multiple processors 111 may serve as CPUs in the display panels 106 and 108. Moreover, one or multiple processors 111 may serve as graphics processors in the display panels 106 and 108. For example, in accordance with some implementations, the display panel 106 may contain a multiple processing core CPU and a graphics processor; and similarly, the display panel 108 may contain a multiple core CPU and a graphics processor. In accordance with further example implementations, CPUs may perform graphics processing in the display panels 106 and 108.

The memory 520, in general, is a non-transitory storage medium that may store, as examples, user input data, data acquired by the sensors 121, machine-executable instructions that are executed by the processor(s) 111 for purposes of implementing one or more of the techniques that are described herein, data representing a determined display configuration, data representing a facial recognition result, data representing a user holding pattern, data representing a distance between a user and the electronic device 104, and so forth. The memory 520 may be formed from semiconductor storage devices, memristors, magnetic storage devices, phase change memory devices, a combination of one or more of these storage technologies, and so forth, depending on the particular implementation.

In accordance with example implementations, the hardware 510 may further include the display devices 106 and 108, the camera 114, the sensors 121, wireless interfaces 534 and 538. In accordance with example implementations, the sensors 121 may include accelerometers that are mounted on the display panels 106 and 108 for purposes of providing signals to the display controller engine 115, which represent the spatial orientations of the display panels 106 and 108. In this manner, from these spatial orientations, the display controller engine 115 may identify the opening angle θ, whether the display panels 106 and 108 are in portrait or landscape orientations, whether one of the display panels 106 and 108 is facing down or up, and so forth. In accordance with some implementations, the sensors 121 include three component accelerometers that are disposed in each display panel 106 and 108. In this manner, each three component accelerometer may have three orthogonal sensitive axes and provide corresponding signals that form the output for the sensors 121.

Moreover, in accordance with example implementations, the hardware 510 may include a camera data multiplexor 540, which may be controlled by the display controller engine 115 (FIG. 1) for purposes of selectively routing the image data acquired by the camera 114 so that the resulting camera images are displayed on the display 107, on the display 109 or on both displays 107 and 109. In this regard, in accordance with some implementations, the camera data multiplexor 540 may control routing of data to either a memory that is accessed by a graphics processor of the display panel 106, a graphics processor of the display panel 108, or graphics processors of both display panels 106 and 108. Thus, in accordance with example implementations, the camera data multiplexor 540 may be controlled by the display controller engine 115, based on the selected camera mode or modes. In accordance with further example implementations, the camera data multiplexor 540 may be software-based, i.e., formed by executable instructions, which are executed by one or multiple processors 111.

In accordance with example implementations, the machine executable instructions 560 of the electronic device 104 may include instructions 564, that when executed by the processor(s) 111, cause the processor(s) 111 to provide a graphical user interface (GUI), for purposes of receiving user input, including receiving input selecting device mode, receiving input selecting the camera mode, receiving input selected whether the camera mode is to be automatically regulated by the electronic device 104, and so forth, as described herein. Moreover, the machine executable instructions 560 may include instructions 566 that, when executed by one or multiple processors 111, cause the processor(s) 111 to provide the display controller engine 115 (FIG. 1). Moreover, the machine executable instructions 560 may include additional instructions, such as, for example, instructions 574 that are executed by the processor(s) 111 to provide an operating system, sets 570 of instructions that may be executed by the processor(s) 111 to provide one or multiple applications, and so forth.

In accordance with further example implementations, all or part of the above-described processor-based architecture may be replaced by dedicated, hardwired circuitry or by one or multiple application specific integrated circuit (ASICs).

In accordance with further implementations, the selection of the camera mode by the display controller engine 115 allows the emulation of multiple cameras, although the electronic device may have a single camera. In this manner, software of the electronic device may assume that the electronic device has rear facing and front facing cameras. However, the electronic device may accommodate this assumption by selecting the appropriate camera mode for its single camera. More specifically, in accordance with example implementations, in response to an application programming interface (API) request to select a front facing camera, the display controller engine 115 selects the user facing camera mode, and in response to an API request to select a rear facing camera mode, the display controller engine 115 selects the world facing camera mode.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:
1. A method comprising:
  in an electronic device comprising a plurality of display panels that are mounted to allow physically positioning of the display panels to create a plurality of potential display configurations, determining, based on data from a sensor, a display configuration associated with current positions of the display panels, wherein the determined display configuration is one of the plurality of potential display configurations, and wherein a camera is mounted on a first display panel of the plurality of display panels; and performing, by the electronic device, automatic camera mode selection for the camera to track changes of the electronic device among the plurality of potential display configurations, the automatic camera mode selection comprising selecting, by the electronic device from a plurality of camera modes, a first camera mode for the electronic device based on the determined display configuration, wherein the plurality of camera modes comprises:

a user facing camera mode in which the electronic device selects the first display panel as a viewfinder for the camera and displays an image captured by the camera on the first display panel, and a world facing camera mode in which the electronic device selects a second display panel as the viewfinder for the camera and displays the image captured by the camera on the second display panel, wherein the second display panel is one of the plurality of display panels and is different from the first display panel.

2. The method of claim 1, wherein the selecting of the first camera mode comprises selecting the user facing camera mode in response to sensing a display configuration corresponding to a clam shell device mode, a flat device mode, a stand device mode, or a book device mode.

3. The method of claim 1, wherein the selecting of the first camera mode comprises selecting the world facing camera mode in response to sensing a display configuration corresponding to a tent device mode.

4. The method of claim 1, wherein the electronic device comprises a user interface, the method further comprising:

selecting the user facing camera mode in response to the user interface receiving an input representing selection of a device mode associated with the user facing camera mode; and selecting the world facing camera mode in response to the user interface receiving an input representing selection of a device mode associated with the world facing camera mode.

5. The method of claim 1, wherein the selecting of the first camera mode comprises selecting the world facing camera mode in response to sensing a display configuration associated with a world facing tablet device mode.

6. The method of claim 1, wherein the selecting of the first camera mode is further based on a recognized user holding pattern of the electronic device.

7. The method of claim 1, wherein the selecting of the first camera mode is further based on a detection of a recognized user face.

8. The method of claim 1, wherein the selecting of the first camera mode is further based on a detection of a recognized user face within a predetermined distance threshold.

9. The method of claim 1, further comprising:

overriding, by the electronic device responsive to a user selection in a user interface, the automatic camera mode selection; and in response to the overriding, selecting a camera mode from the plurality of camera modes based on a user-selected camera mode.

10. The method of claim 1, further comprising:

determining, by the electronic device, a distance of a user's face from the electronic device, wherein the selecting of the first camera mode from the plurality of camera modes is further based on determining whether the user's face is within a distance threshold.

11. An article comprising a non-transitory computer readable storage medium comprising instructions that when executed by a computer cause the computer to:

determine a display configuration from a plurality of potential display configurations in response to detecting a physical orientation of a first display device of the computer relative to a second display device of the computer, wherein the first display device and the second display device of the computer are pivotably mounted to the computer, and a camera of the computer is mounted on the first display device, and wherein the plurality of potential display configurations correspond to different physical orientations of the first display device relative to the second display device;

perform automatic camera mode selection for the camera to track changes of the computer among the plurality of potential display configurations, the automatic camera mode selection comprising selecting, from a plurality of camera modes, a first camera mode for the computer based on the determined display configuration, wherein the plurality of camera modes comprises:

a user facing camera mode in which the computer selects the first display device as a viewfinder for the camera and displays an image captured by the camera on the first display device, and a world facing camera mode in which the computer selects the second display device as the viewfinder for the camera and displays the image captured by the camera on the second display device.

12. The article of claim 11, wherein the instructions when executed cause the computer to:

detect a manner in which the computer is being held by a user; and selectively display the image on the first and second display devices based at least in part on the detected manner.

13. The article of claim 11, wherein the instructions when executed cause the computer to:

process sensory input acquired by the computer to recognize a user of the computer; and selectively display the image on the first and second display devices based at least in part on a result of the processing of the sensory input.

14. The article of claim 11, wherein the instructions when executed cause the computer to:

detect a proximity of a user to the computer; and selectively display the image on the first and second display devices based at least in part on a result of the proximity detection.

15. The article of claim 11, wherein the instructions when executed cause the computer to:

override, responsive to a user selection in a user interface, the automatic camera mode selection; and in response to the overriding, select a camera mode from the plurality of camera modes based on a user-selected camera mode.

16. The article of claim 11, wherein the instructions when executed cause the computer to:

determine a distance of a user's face from the computer, wherein the selecting of the first camera mode from the plurality of camera modes is further based on determining whether the user's face is within a distance threshold.

17. An electronic device comprising:
a first display panel;
a second display panel pivotably connected to the first display panel;
a camera mounted to the first display panel;
a sensor to detect physical orientations of the first and second display panels; and
a processor to:
  determine, based on data from the sensor, a display configuration associated with current positions of the first and second display panels, wherein the determined display configuration is one of a plurality of potential display configurations corresponding to different physical orientations of the first display panel relative to the second display panel; and
  perform automatic camera mode selection for the camera to track changes of the electronic device among the plurality of potential display configurations, the automatic camera mode selection comprising selecting, from a plurality of camera modes, a first camera mode for the electronic device based on the determined display configuration, wherein the plurality of camera modes comprises:
    a user facing camera mode in which the electronic device selects the first display panel as a viewfinder for the camera and displays an image captured by the camera on the first display panel, and
    a world facing camera mode in which the electronic device selects the second display panel as the viewfinder for the camera and displays the image captured by the camera on the second display panel.

18. The electronic device of claim 17, wherein:
the processor is to, in response to detecting that the camera faces away from a user of the electronic device, disable the first display panel and enable the second display panel to cause the second display panel to display an image acquired by the camera.

19. The electronic device of claim 17, wherein the processor is to:
override, responsive to a user selection in a user interface, the automatic camera mode selection; and
in response to the overriding, select a camera mode from the plurality of camera modes based on a user-selected camera mode.

20. The electronic device of claim 17, wherein the processor is to:
determine a distance of a user's face from the electronic device,
wherein the selecting of the first camera mode from the plurality of camera modes is further based on determining whether the user's face is within a distance threshold.

* * * * *